PROCESS FOR CHEMICAL REACTION IN THE ADSORBED PHASE OF SOLID ADSORBENTS
Filed Jan. 21, 1949
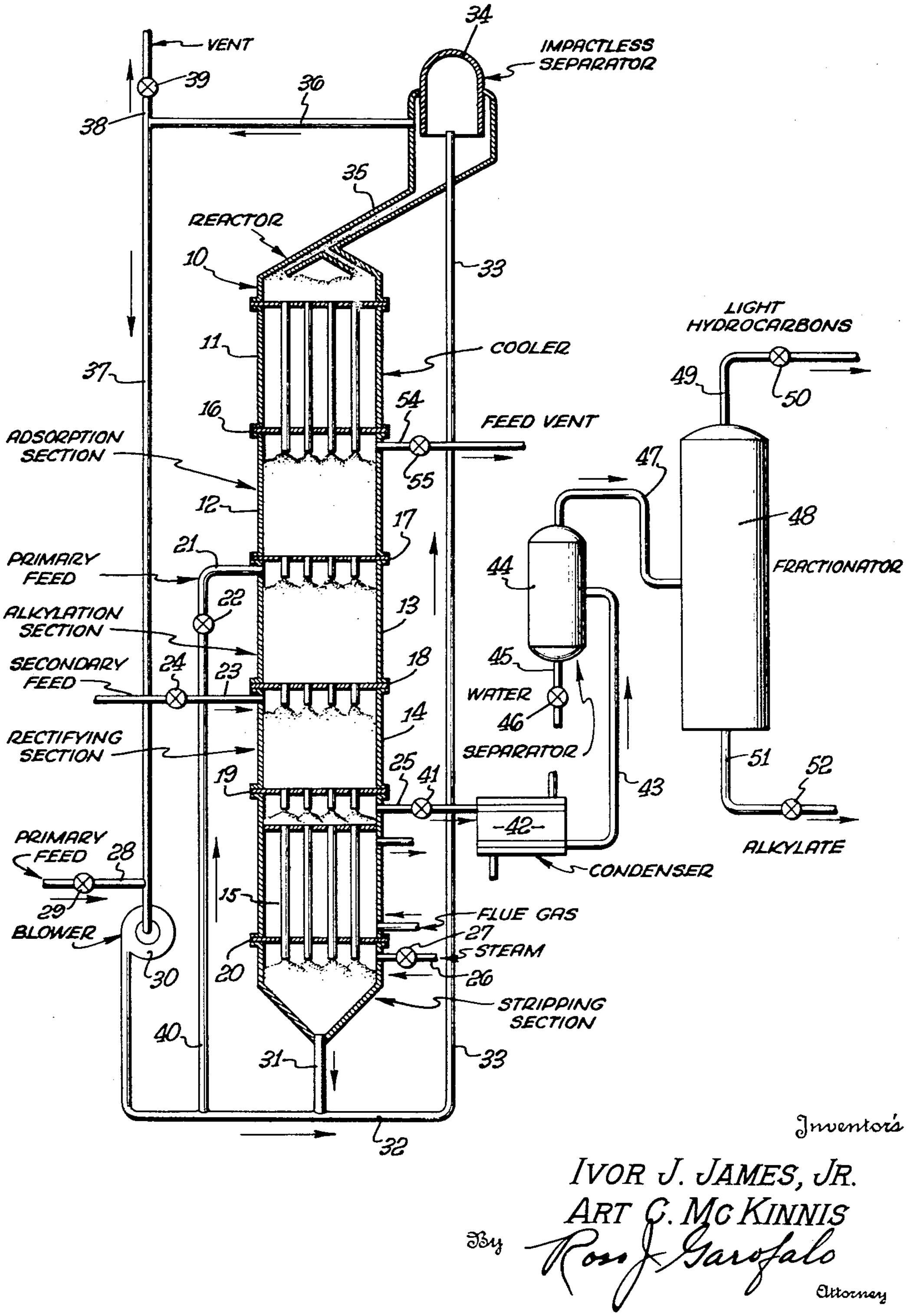
Inventors
IVOR J. JAMES, JR.
ART C. McKINNIS
By Ross J. Garofalo
Attorney United States Patent Office 2,756,247

Patented July 24, 1956

1

2,756,247

PROCESS FOR CHEMICAL REACTION IN THE ADSORBED PHASE OF SOLID ADSORBENTS

Ivor J. James, Jr., Bellflower, and Art C. McKinnis, Long Beach, Calif., assignors to Union Oil Company of California, Los Angeles, Calif., a corporation of California Application January 21, 1949, Serial No. 71,826

26 Claims. (Cl. 260—449)

The present invention relates to a process for the chemical conversion of gaseous reactants in the presence of an adsorbent. The process is characterized by the fact that the chemical reaction between the gaseous reactants takes place in the adsorbed phase under unusually high pressures existing on the adsorbent while the system pressure as measured by gauges may be at or near atmospheric. This feature of the process materially simplifies the apparatus in which the reactions are effected. The adsorbent may or may not contain catalytic materials.

A specific application of the invention comprises a process for the combining of isoparaffinic hydrocarbons of relatively low molecular weight with olefinic hydrocarbons to produce branched chain paraffinic hydrocarbons of higher molecular weight and boiling within the gasoline range which are of particular value as motor fuels or constituents thereof in that they possess unusually high octane values.

In another embodiment, this invention comprises a process whereby gaseous olefin hydrocarbons may be converted by hydration to the corresponding alcohols which are valuable as solvents and chemical intermediates.

The present invention in its broader aspect comprises a process for effecting chemical reactions which are aided by the application of pressure or by the rapid removal of one of the products from the sphere of reaction or both, which process is characterized by the procurement of the desired pressure in a novel way as hereinafter more fully described. The foregoing statements with regard to alkylation and hydration are not intended to limit the present invention since it may readily be applied to other reactions the rate of which is desirably affected by pressure.

It is an object of the present invention to provide a simple and efficient process whereby chemical reactions involving gaseous or vaporous reactants and which are facilitated by the application of pressure may be carried out in the presence of a solid adsorbent without the requirement of heavy equipment normally associated with high pressures.

A further object of this invention is to provide a process wherein adsorption pressures developed by the attraction of solid granular adsorbents for adsorbable gases are applied to the reaction of such gases with other constituents.

It is another object of this invention to provide a simple and efficient alkylation process employing a solid type catalyst which eliminates many of the mixing and contact disadvantages of the present solid catalyst type alkylation process.

It is a more particular object of the present invention to provide a process and apparatus for the alkylation of olefins and particularly $C_2$ to $C_6$ olefins which are novel and desirable in that they may be operated satisfactorily and economically at low or atmospheric pressure.

It is another object of this invention to provide a simple and efficient process for the hydration of olefins which eliminates many of the objectionable high pressure features of the present solid catalyst type hydration processes.

2

More particularly it is an object of the present invention to provide an olefin hydration process which is novel in that it may be run with equal effectiveness at atmospheric pressure as at higher pressures and is economical to operate.

Another object of this invention is to provide an improved process whereby olefin oxides may be prepared from the oxidation of olefins, aldehydes may be prepared by the oxidation of alcohols or by the ozonization of olefins, nitric acid may be prepared by the continuous hydration of nitrogen dioxide and oxidation of nitric oxide, esters may be prepared by the continuous esterification of an alcohol with an acid, sulfur may be prepared by the continuous reaction of hydrogen sulfide and sulfur dioxide, synthetic hydrocarbons and oxygenated hydrocarbons may be prepared by the hydrogenation of carbon monoxide, and other chemical conversion reactions in which the rate of combination or reaction of gaseous reactant is facilitated by the application of pressure.

A further object of this invention is to provide a process whereby the foregoing reactions are carried out under a pressure generated by the attraction of the adsorbent for the gaseous reactants without the necessity of compressing the reactant to a superatmospheric reaction pressure.

Other objects and advantages of this invention will become apparent to those skilled in the art as the description thereof proceeds.

Briefly the present invention resides in the utilization of the tremendously high adsorption pressures exhibited by certain forms of activated charcoal as a substitute for the induced pressure necessary in chemical conversions such as contact catalyzed alkylation. It is well known that certain forms of activated charcoal show exceedingly high adsorption capacity for hydrocarbons which capacity is doubtless a function of the large surface area of such charcoal approaching some cases as much as 800 square meters per gram. The significance of this surface area in resultant adsorption capacity may be emphasized by comparison with that of the higher grades of activated alumina which may range from about 200 to about 300 square meters per gram. We have developed a method of operation of the alkylation process wherein this high adsorption capacity and induced pressures may be utilized effectively thus eliminating the necessity of the use of exceedingly high operation pressures.

For the process of this invention it is essential that a charcoal be employed which possesses a comparatively high mechanical strength sufficient to resist excessive abrasion in a moving bed operation. For this purpose the various shell or hull charcoals such as coconut charcoal, apricot pit charcoal, and similar charcoals are decidedly superior to the animal charcoal such as bone charcoal and blood charcoal which exhibit very little if any mechanical strength. These hull or pit charcoals may be activated in any desired manner such as heating from about 500° C. to about 1000° C. in the presence of steam, carbon dioxide, air or other oxidizing agents whereby the oxygen and hydrogen containing impurities in the charcoal are removed leaving essentially the pure carbon structure. These charcoals are employed in the process of this invention in the form of small granules such as from about 2 to 40 mesh or preferably from about 10 to 20 mesh and of the above types the steam activated coconut hull charcoal is preferred.

In many reactions which may be carried out employing the principles of this invention, the charcoal adsorbent itself is sufficient to exert pressure necessary by adsorption of the reactants to effect the reaction desirably.

This is true in reactions involving alkylation of gaseous olefin and isoparaffin hydrocarbons, hydration of gaseous olefins, and other reactions. However, it is entirely within the scope of the present invention to employ a catalyst impregnated on the adsorbent to increase the rate of reaction in the desired direction.

The term "isoparaffins" or "isoparaffinic hydrocarbons," as employed in the present specification and claims, relates to the lower members of the paraffin series, namely to isobutane, isopentane and isohexane. It has been discovered, however, that the rates of alkylation of these isoparaffinic hydrocarbons, while maintaining other conditions equal, are not the same. Thus, the rate of alkylate formation when isopentane is employed is considerably lower than the rate of alkylation of isobutane, while the alkylation rate for isohexane is even still lower.

As to the terms "olefins" and "olefinic hydrocarbons," they are used herein to denote both the normally gaseous olefins and the normally liquid olefins. The normally gaseous olefinic hydrocarbons comprise the unsaturates between ethylene and the pentenes, while the liquid olefins include the hexenes and other olefins of greater molecular weight.

Catalytic agents for alkylation which may be employed include sulfuric acid or phosphoric acid or mixtures of these acids as well as these acids in combination with certain metallic activators which tend to favor alkylation in preference to polymerization of the olefins. These metallic activators include the sulfates, phosphates, acetates, chlorides, nitrates, and oxides of metals such as cadmium, zinc, copper, mercury, silver, and barium. Other catalytic agents may be employed in the absence of sulfuric or phosphoric acid including particularly the metal halides such as aluminum chloride, aluminum bromide and antimony trichloride, arsenic trichloride, phosphorus trichloride, and the like. It is to be understood that our invention is not limited to the particular catalytic agent employed inasmuch as many of these are well known in the art, but is more specifically directed to the method of alkylation wherein catalytic agents are employed in conjunction with activated charcoal in a new and novel manner as hereinafter described. Whereas, activated charcoal is the preferred adsorbent according to our invention it should be understood that other highly adsorptive solid materials may also be employed inasmuch as the effective internal pressures are related to the adsorptive capacity or surface area of the particular adsorbent.

In olefin hydration improved results are obtained by impregnating the charcoal with a catalytic agent such as phosphoric acid, sulfuric acid, or various metal salts of these acids. It is preferable to employ phosphoric acid or sulfuric acid in the free state for the impregnation of carbon adsorbent, but the salts of these acids may also be effectively employed providing an excess of free acid is present. If the salts are employed in this manner those of the metals of the first, second, and third transitional groups are preferred. These transitional groups include those elements having electronic structures such that the differentiating electron is in the second from the outermost shell; that is, the outermost shell remains substantially unchanged with two electrons while the second from the outermost shell is being built up from 8 to 18 electrons. The metals of the first transitional group are those having atomic numbers between 21 and 30 and include scandium, titanium, vanadium, chromium, manganese, iron, cobalt, nickel, copper, and zinc. Those of the second transitional group have atomic numbers between 38 and 48 and include yttrium, zirconium, columbium, molybdenum, masurium, ruthenium, rhodium, palladium, silver, and cadmium. Those of the third transitional group have atomic numbers 57 and 72 to 80 and include lanthanum, hafnium, tantalum, tungsten, radium, osmium, iridium, platinum, gold, and mercury.

The foregoing catalytic agents are of course suitable for other than the alkylation and hydration reactions. The charcoal may be impregnated with other catalytic agents than those disclosed above for other gas reactions aided by pressure or by the removal of the product rapidly from the sphere of reaction and it is within the scope of the present invention to employ known catalysts in these reactions.

The activated charcoal may be impregnated with one or more of these or other catalytic agents in any desired manner with the only restriction being that the impregnation be carried on in such a way that the adsorptive capacity of the charcoal is not materially decreased. Thus if the desired catalytic agent to be employed is phosphoric acid, it is preferable to impregnate with a dilute solution of the acid to avoid plugging of the interstices of the charcoal. Similar care is necessary if the impregnation of a metal salt is desired inasmuch as the use of a too concentrated impregnating solution will not only result in a final composition containing a higher proportion of catalytic agent than is necessary, but will also tend to block a high percentage of the pore openings in the charcoal thus reducing its adsorptive capacity to inoperable levels. Subsequent to the impregnation the charcoal, upon which is distended a catalytic agent or a convertible form of the catalytic agent, is dried to give the final catalyst.

The essential elements of the process in the alkylation embodiment of this invention comprise the adsorption of the lower molecular weight hydrocarbon whether it be the olefin or the isoparaffin on the charcoal catalyst, the simultaneous stripping and alkylation of this lower molecular weight hydrocarbon containing in the charcoal by means of the higher molecular weight hydrocarbon, stripping of the preferentially adsorbed alkylate from the carbon catalyst with steam, and finally the separation of the alkylate from the alkylate-steam mixture which results. Thus, for example, in the alkylation of butylenes with isobutane the butylenes are adsorbed on the charcoal catalyst in the first step of the operation and in the adsorbed state are under a pressure within the charcoal which has been shown to range as high as 500 atmospheres. It should be emphasized that this pressure is solely the effect of the attraction of the hydrocarbon by the charcoal and is in no way brought about by an induced pressure in the olefin feed stream. Thus, advantage may be taken of these extremely high pressures to bring about the alkylation reaction without the necessity of employing a high pressure alkylation system or high pressure feed stream. In this example the charcoal catalyst containing the adsorbed olefins under these tremendous pressures is subsequently contacted with isobutane, which, due to its higher molecular weight, is preferentially adsorbed by the charcoal displacing the olefins from the catalyst. In this process of displacement we have found that alkylation takes place presumably due to the existence at some time within the catalyst of both isoparaffin and olefin phases under these very high pressures. The charcoal catalyst is maintained throughout this process at a temperature sufficient not only to effect alkylation of the olefin but to prevent a condensation of the desorbed hydrocarbons or of stripping steam in the reaction system. Thus the minimum temperature of operation is governed by the boiling point of the particular hydrocarbons employed or the steam, whereas, the upper limits are governed only by feasibility of operation, such temperatures as 600° F. to 700° F. being satisfactory although those temperatures decrease the amount of hydrocarbon adsorbed by the catalyst. The alkylate which is formed in this combination stripping and alkylation action is, because of its relatively high molecular weight, preferentially adsorbed by the charcoal and passed therewith out of the alkylation zone.

The catalyst is subsequently heated to a higher temperature and stripped with small quantities of steam which has the effect of displacing the alkylate from the carbon and leaving an essentially dry charcoal catalyst because of the higher temperatures of this secondary stripping operation. The alkylate-steam mixture is withdrawn from this stripping zone and may be readily resolved into its components by simple phase separation. It is important to examine this process with regard to the critical temperatures of the various hydrocarbons which may be employed in the reaction. Thus the critical temperature of ethylene is 9.7° C. and at any higher temperature of operation the ethylene will therefore be in the vapor phase even under tremendously high pressures exerted by the charcoal catalyst. Also at temperatures above about 93° C. butylene will exist only in the vapor phase. At temperatures above about 134° C. isobutane will exist only in the vapor phase and above about 190° C., isopentane will exist only in the vapor phase. Thus, if the alkylation reaction is carried out at temperatures above about 200° C. employing $C_5$ hydrocarbons or lighter, the reaction will be entirely in the vapor phase; whereas, at lower temperatures the reaction may be entirely in the liquid phase or partially in the vapor phase and partially in the liquid phase depending upon the particular isoparaffin and olefin employed, and upon the temperature of the process.

It is to be understood that this invention is not limited to either liquid or vapor phase reaction but may be carried on under such conditions of temperature that either or both phases may be present in the catalyst.

The elements of this invention may be more readily understood by reference to the accompanying process diagram, which although showing only one particular mode of operation and being described for the alkylation of ethylene with isobutane is in no way intended to limit this invention either to this particular apparatus or to the particular alkylation feed. In the drawing, reactor 10 is divided into several sections; namely, charcoal cooler 11, adsorption section 12, alkylation section 13, rectifying section 14, and the fired heater stripping section 15. These sections are separated from each other as far as gas flow is concerned by engagers or disengagers 16, 17, 18, and 19 which may be any conventional type of disengager such as a tube sheet with short nipples as indicated in the diagram. The fired heater tubes in stripping section 15 are separated from the point of steam inlet by engager 20. The olefin feed is introduced at disengager 17 by means of line 21 controlled by valve 22 intermediate between adsorption section 12 and alkylation section 13. The feed is preheated to a temperature to correspond to a temperature of the downwardly flowing charcoal catalyst as it enters the upper portion of adsorption section 12. The olefin feed passes upwardly in adsorption section 12 being adsorbed therein by the downwardly flowing charcoal catalyst inducing a temperature rise in the adsorption zone as the result of the exothermic nature of the adsorption phenomena.

The olefin rich charcoal passes downwardly through engager 17 into the alkylation section 13 where it is contacted countercurrently with the isoparaffin introduced at engager 18 by means of line 23 controlled by valve 24. The isoparaffin coming in contact with olefin rich charcoal in the alkylation section 13 has the effect as above described of displacing the olefin from the charcoal catalyst and at the same time effecting the alkylation of a certain proportion of the olefin. The displaced unalkylated olefin thereby migrates upwardly in the column until it comes in contact with the unsaturated charcoal, the alkylate being preferentially adsorbed on the charcoal passes downwardly with the charcoal through engager 18 into the rectifying section 14. The rectifying section has the effect of a fractional distillation separating the alkylate on the catalyst from the isoparaffin so that the catalyst leaving rectifying section 14 is substantially free from light hydrocarbon contaminants.

The isoparaffin entering alkylation section 13 which is not utilized in the alkylation of the olefins or is not adsorbed by the catalyst remains in alkylation section 13 and the height of the isoparaffin in this section is controlled by the rate of its introduction of line 23 and the rate of product takeoff at line 25. A control point may be established within the alkylation section operating on the basis of the temperature rise in the section which may be used to control the rate of product takeoff by means of line 25 and thereby control the isoparaffin level in the alkylation section. The catalyst passing from rectifying section 14 through disengager 19 into fired heater stripper 15 will contain alkylate and a small amount of isoparaffin. These materials are stripped from the catalyst by means of steam introduced into the stripping section by means of line 26 controlled by valve 27, the catalyst being maintained in the section at a temperature at which substantially all of the steam will also be desorbed. The steam and alkylate pass upwardly to section 19 where they are withdrawn as above described and in controlled quantities by means of line 25. Any alkylate which may pass upwardly through section 19 into the rectifying section 14 will be immediately adsorbed by the downwardly flowing catalyst and will be returned thereby to the stripping zone.

The action in the alkylation and rectifying sections is analogous to that of an inverted distillation column. An isoparaffin reflux takes place involving continued adsorption and desorption of the isoparaffin passing into the alkylation section. The reflux level is maintained at some point between the introduction line 23 and a controlled point established in the alkylation section. The catalyst discharged from the stripper 15 is at a sufficient temperature so that it is substantially dry, containing only very minor amounts of water in vapor or liquid form. This charcoal catalyst is then returned to the top of reactor 10 to complete the continuous cycle. The method of conveying the charcoal to the top of the reactor may involve gas lift or mechanical lift in any of their various modifications. In the drawing, a gas lift method is shown whereby the olefin feed is introduced by means of blower 30 via line 28 controlled by valve 29 picking up the charcoal from sealing leg 31 as it is forced through line 32 and passing up line 33 into the impactless separator 34. This separator operates on the principle of the decreased velocity of the gas stream upon increasing the effective diameter of the stream, thus the diameter of impactless separator 34 is considerably larger than the diameter of line 33 whereby the charcoal readily drops out of the gas stream and flows from the separator down transfer line 35 into the top of reactor 10. The olefin feed flows through the top of separator 34 via lines 36 and 37 back to blower 30 and subsequently into line 32. The recycle gas system is furnished with a vent means via line 38 controlled by valve 39. In this manner of operation the olefin feed introduced into reactor 10 at disengager 17 by means of line 21 is obtained as a side stream from the gas life blower by means of line 40. Gases other than the hydrocarbon feed may be used in the gas lift, but a partial contamination of the charcoal catalyst will result inasmuch as in the manner described we have found that the charcoal passing through line 35 from the impactless separator 34 is partially saturated with the olefin feed. The steam-alkylate mixture withdrawn from stripping section 15 by means of line 25 controlled by valve 41 is passed through condenser 42 via line 43 into separator 44. In separator 44 a phase separation takes place between the hydrocarbons and water, the water phase being withdrawn from the bottom of the separator by means of line 45 controlled by valve 46 and is passed to waste.

The upper or hydrocarbon phase is withdrawn from the top of separator 44 and is passed via line 47 into fractionator 48. In the fractionator any residual nonalkylated hydrocarbons are distilled from the alkylate and are taken overhead by means of line 49 controlled by valve 50. The stabilized alkylate is withdrawn from the bottom of fractionator 48 by means of line 51 controlled by valve 52.

Many modifications may be made in the reaction system without departing from the principles of this invention. Thus the primary hydrocarbon feed may be in excess of that adsorbed by the catalyst in order to insure complete saturation thereof. For this purpose a feed vent is provided at the top of the adsorption section represented in the drawing by line 54 controlled by valve 55. Further, in place of the gas lift catalyst circulation system a mechanical lift means may be employed. Other modifications may also be made in the apparatus and in the mode of operation in which the primary element of this invention is utilized.

The temperatures within the reactor are controlled in regard to different factors; namely, the optimum temperatures of alkylation and the prevention of the actual condensation of any steam or hydrocarbon on the external surface of the charcoal catalyst. Thus, for example, in an alkylation of ethylene the temperature of the catalyst leaving charcoal cooler 11 may be maintained at about 150° F. or higher and as a result of the exothermic heat of adsorption the temperature of the olefin rich charcoal passing through engager 17 from adsorption section 12 will be in the range of about 150° F. to 200° F. or higher. A further temperature rise will occur in alkylation section 13 and the temperature of the catalyst containing the adsorbed alkylation products passing into the rectifying section 14 will be in the range of about 200° F. to 230° F. In the stripper 15 the temperature of the charcoal is raised to about 400° F. to insure substantially complete removal therefrom of alkylation products and steam. In the course of transferring the charcoal catalyst from the bottom of reactor 10 to the top thereof some cooling will take place and the charcoal will be further cooled in cooler 11 to the desired temperature of introduction into adsorption section 12. It is to be understood that these temperatures exemplify only one means of operation and a wide variation may be employed providing the two above stipulations are observed.

The essential elements of the process of olefin hydration in the present invention comprise the adsorption of the olefin to be hydrated on the charcoal catalyst, a simultaneous stripping and hydration of the olefins contained in the charcoal, stripping of the preferentially adsorbed alcohol from the carbon, and finally separation of the alcohol from the alcohol-steam mixture which results. Thus in the first step of the operation the olefins are adsorbed by the charcoal and in the adsorbed state are under a pressure which has been shown to range as high as 500 atmospheres. It should be emphasized again that this pressure is solely the effect of the attraction of the olefins by the charcoal and is in no way brought about by the induced pressure on the olefin feed stream. The charcoal catalyst containing the adsorbed olefin under these tremendous pressures is subsequently treated with steam which is preferentially adsorbed displacing the olefins from the catalyst. In the process of this displacement hydration takes place due presumably to the existence at some time within the catalyst of both a water and olefin phase under these very high pressures. The charcoal catalyst is maintained throughout this process at a temperature sufficient not only to effect the hydration of the olefin but to prevent the condensation of the stripping steam on the outer surfaces of the charcoal. The alcohols which are formed in this combination stripping and hydration action are, because of their higher molecular weight, preferentially adsorbed by the charcoal and pass therewith out of the hydrating zone.

The catalyst is subsequently heated to a higher temperature and further stripped with small quantities of steam which has the effect of removing the alcohol from the carbon and leaving an essentially dry charcoal because of the higher temperatures of this second stripping. The alcohol-steam mixture is withdrawn from the stripping zone and may be readily resolved into its components by simple distillation resulting of course in the azeotrope of water with the alcohol formed. If the olefin employed in the process comprises a $C_4$ olefin or higher, the alcohol resulting, butyl and amyl alcohol and the like, is immiscible with water and may be separated from the steam-alcohol mixture obtained as the product by simple condensation and phase separation and distillation.

Although the drawing relates exclusively to the employment of the principles of this invention for the alkylation of olefins, it also applies to the hydration of olefins in which the primary feed introduced via line 28 through blower 30 into lines 40 and 21 into the reactor comprises the olefin to be dehydrated and the secondary feed introduced via line 23 is not used. In this modification adsorption section 12 becomes the saturation section wherein the charcoal is saturated with olefin to be hydrated and sections 13 and 14 shown in the drawing comprise the hydration section. It may be desirable to introduce a small quantity of hydration steam as the secondary feed.

The apparatus shown in the drawing is particularly modified for the alkylation of gaseous hydrocarbons; however, it may be employed without substantial change to the hydration of olefins. The most important alteration is that usually no secondary feed is introduced and alkylation section 13 becomes hydration section 13.

The elements of this invention may be more readily understood by reference to the accompanying process diagram, which although showing one particular mode of operation and being described for the hydration of ethylene is in no way intended to limit our invention either to the particular apparatus or to the particular olefin feed. In the drawing, reactor 10 is divided into sections; namely, charcoal cooler 11, adsorption section 12, steam treating or hydration section 13, rectifying section 14, and the fired heater stripper 15. These sections are separated from each other as far as gas flow is concerned by disengagers or engagers 16, 17, 18, and 19, which may be any conventional type of disengagers such as a tube sheet with short nipples as shown in the diagram. The olefin feed is introduced at engager 17 by means of line 21 intermediate between adsorption section 12 and hydration section 13 as the primary feed. The feed is preheated to a temperature to correspond to a temperature of the downwardly flowing charcoal catalyst as it enters the upper portion of adsorption section 12. The olefin feed passes upwardly in adsorption section 12 being adsorbed therein by the downwardly flowing charcoal catalyst inducing a temperature rise in the adsorption zone as the result of the exothermic nature of the adsorption phenomenon.

The olefin rich charcoal passes downwardly through engager 17 into the hydration section 13 where it is contacted countercurrently with steam introduced at the bottom stripping section 15 by means of line 26. The steam coming in contact with olefin rich charcoal in the hydration section 13 has the effect as above described of displacing the olefin from the charcoal catalyst and at the same time effecting the hydration of a certain proportion of the olefin. The displaced unhydrated olefin thereby migrates upwardly in the column until it comes in contact with the unsaturated charcoal, the alcohol being preferentially adsorbed on the charcoal and passes downwardly with the charcoal through disengager 19 into the fired heater stripper 15.

The steam entering hydration section 13 which is not utilized in the hydration of the olefins or is not adsorbed by the catalyst remains in hydration section 13 and the height of the steam in this section or the distance upward through this section that the steam progresses before being adsorbed is controlled by the rate of introduction through line 26 and the rate of product takeoff at line 25. A control point may be established within the hydration section 13 operating on the basis of the heat of hydration which may be used to control the rate of product takeoff by means of line 25 and thereby control the steam level in the hydration section.

The catalyst passing from hydration section 13 into rectifying section 14 is subjected to a countercurrent flow of product vapors which rise into section 14 and are adsorbed therein. The preferential desorption of unhydrated olefins occurs due to the countercurrent flow of this mixture of steam and alcohol. The remaining portion of this vapor is removed via line 25 controlled by valve 41 as product and the action of the rectifying section is such to insure the absence of unhydrated olefin from the product gas or vapor thus withdrawn.

The catalyst passing from rectifying section 14 through disengager section 19 into fired heater stripper 15 will contain steam, alcohol, and in most cases small amounts of ether. These materials are stripped from the catalyst by means of heating the catalyst to a point at which substantially all of the alcohol is desorbed, at which temperature substantially all of the steam will also be desorbed. The steam and alcohol pass upwardly to disengaging section 19 where they are withdrawn as above described and in controlled quantities by means of line 25. Any alcohol which may pass upwardly through engaging section 17 into the hydration section 13 will be immediately adsorbed by the downwardly flowing charcoal and will be returned thereby to the stripping zone.

The action in the hydration and rectifying sections appears to be analogous to that of an inverted distillation column, that is a steam reflux takes place involving continued adsorption of any steam being allowed to pass into the hydration section and desorption in stripper 15. This steam recycle is thus maintained between the introduction line 26 and the control point established in hydration section 13. The charcoal discharged from the stripper 15 is at a sufficient temperature so that it is substantially dry, containing only very minor amounts of water in vapor or liquid form. This charcoal catalyst is then returned to the top of reactor 10 to complete the continuous cycle.

The steam-alcohol mixture described above is withdrawn from disengager 19 via line 25 controlled by valve 41 and is cooled in condenser 42. Should the alcohol formed have a molecular structure containing 4 carbon atoms or more, or the compound formed is otherwise insoluble in water the material is removed from condenser 42 and passed via line 43 into separator 44. The alcohol may subsequently be fractionated in fractionator 48 to remove impurities. If the alcohol is soluble in water the aqueous soluble solution removed from condenser 42 is introduced through separator 44 into fractionator 48 for distillation.

The temperatures within the reactor in the hydration operation are dictated in the manner as those for alkylation described above; namely, the optimum temperature for hydration and the prevention of actual condensation of any steam on the surface of any charcoal catalyst. Thus, for example, in the hydration of ethylene, the temperature of the catalyst leaving charcoal cooler 11 may be maintained at about 200° F. and as a result of the exothermic heat of adsorption the temperature of the olefin rich charcoal passing through engaging section 17 from adsorption section 12 will be in the range of about 230° F. to 250° F. A further temperature rise will occur in hydration section 13 and the temperature of the catalyst containing the adsorbed hydration products passing into the fired heater stripper 15 will be in the range of about 250° F. to 270° F. In the stripper 14 the temperature of the charcoal is raised to about 350° F. to insure substantially complete removal therefrom of hydration products and steam. In the course of transferring the charcoal from the bottom of reactor 10 to the top thereof some cooling will take place, and the charcoal will be further cooled in cooler 11 to the desired temperature of introduction into adsorption section 12. It is to be understood that these temperatures exemplify only one means of operation and a wide variation may be employed providing the two above stipulations are observed.

It is interesting to note that these temperatures of operation lie above the critical point of ethylene and as a result regardless of the internal pressures exerted by the charcoal catalyst the ethylene will remain in the vapor phase at a high state of activation energy and it is presumably for this reason that the ethylene represents both the easiest olefin to alkylate and hydrate. However, both the alyklation and hydration of higher molecular weight olefins such as propylene, butylenes, amylenes, and the like may be effected by the processes described above.

In the hydration of these higher molecular weight olefins it is necessary only to adjust the temperature of the fired heater stripper in order to insure the efficient desorption of the hydrated product from the charcoal in the stripping section. If, however, it is desired to hydrate olefins which boil above the minimum temperature of charcoal in hydration section 13 which has been established at about 230° F. it will be necessary to increase this temperature and other temperatures throughout the reactor correspondingly in order to effect vaporization of the olefin feed which is necessary to prevent downward flow of the olefin in the column.

Depending upon the temperatures of operation and upon the catalyst employed, minor amounts of polymerization may accompany the alkylation or hydration reactions in which case it has been found necessary to install a small charcoal treater involving simply the high temperature steam treatment of the charcoal to remove the polymerization products prior to reintroduction in the reactor cycle.

Another interesting aspect of the present invention is the possibility of selective hydration of a particular olefin in a mixed olefin feed. Inasmuch as the charcoal catalysts exhibit a preferential adsorption increasing with an increase in the molecular weight of the hydrocarbon, it is possible by means of the process of this invention to introduce into the reactor a mixed olefin feed such as an ethylene-propylene feed, selectively adsorbing the propylene from the mixture thereby carrying only the propylene down through the reactor, the ethylene passing upwardly in the adsorption section to disengager section 16 where it may be withdrawn by means of the olefin recycle line 54. Thus in the one operation we may effect a separation of two olefins and a selective hydration of one.

It is also within the scope of the present invention to employ the processes herein described for the hydration of acetylenes realizing thereby the big advantage that the acetylenes are under pressure only in a cellular type body thereby eliminating the danger from explosions brought about by chain reactions of acetylenes under pressure.

The following examples illustrate the application of the chemical conversion process of the present invention to carrying out other diverse chemical reactions in which the superatmospheric pressure generated by the attraction of the adsorbent by the gaseous or vaporous reactants are employed to facilitate the desired reaction.

The hydration of ethylene with steam to form ethyl alcohol is illustrative of olefin hydration operations in the process and apparatus of the present invention. The carbon circulated through the reactor preferably contains a hydration catalyst which may comprise sulphuric acid, phosphoric acid, or various metal salts of these acids. Other known hydration catalysts may be employed if desired.

*Example I*

Pure ethylene, an ethylene concentrate, or other gas containing ethylene in the absence of appreciably higher molecular weight hydrocarbons is introduced at a rate of 150 pound mols per hour as the primary feed into the reactor. The rate of circulation of carbon which may contain a catalyst is such that a substantially complete adsorption of this quantity of primary feed is effected. The temperature of the carbon at this point is preferably about 100° F. In this modification no secondary feed is introduced. The hydration steam is introduced at a rate of about 450.0 pounds per hour at a point below the charcoal stripper. The steam passes upwardly through the tubes of the heater countercurrent to the charcoal and a portion of the steam passes upwardly into the hydration zone, corresponding to the alkylation and rectifying sections shown in the drawing. At this point ethylene hydration takes place in the adsorbed phase on the carbon to form ethyl alcohol which passes downwardly into the heating zone with the moving bed of carbon. A mixture of ethyl alcohol and steam as a vapor is removed at a point just above the heater and is condensed to form an aqueous alcohol solution. Under these conditions alcohol is produced at a rate of about 600 pounds per hour.

*Example II*

The oxidation of ethylene with ozonized air to form formaldehyde and hydrogen peroxide is carried out as follows:

Ozonized air containing about 2 to 3 volume per cent of ozone is employed as the primary feed and a gas containing ethylene is employed as the secondary feed. The temperature of the carbon is adjusted to about 210° F. Under these conditions the yield of formaldehyde is substantially quantitative based on the amount of ozone in the primary feed. The adsorbed formaldehyde is stripped from the charcoal in the heater as above described in the presence of stripping steam and concentrated in fractionator 48 shown in the drawing.

*Example III*

The preparation of ethylene oxide may be carried out in the reactor of this invention by employing a charcoal impregnated with a silver catalyst. The temperature of the charcoal is preferably maintained at about 300° F. to 400° F. adjacent the points where the primary and secondary feeds are introduced. The primary feed consists of a gas containing oxygen such as air, oxygen enriched air, or flue gas containing excess air, and the like. A gas containing ethylene is employed as the secondary feed. The ethylene oxide thus produced is more readily adsorbable than either the primary or secondary feed and is carried into the desorption or heating zone with the charcoal. Desorption of the adsorbed ethylene oxide may be carried out with steam if the desired product is ethyl alcohol. However, for the recovery of ethylene oxide as such, the desorption must be carried out in the absence of steam such as by mild heating alone or by preferential desorption using a more readily adsorbable vapor such as butane or pentane from which it is readily separable.

*Example IV*

The reaction of ethylene as a representative olefin with hydrogen sulfide may be carried out in the apparatus of this invention by employing ethylene as the primary feed and hydrogen sulfide as the secondary feed. The products of this reaction, carried out in the presence of an adsorbent carbon with or without a catalyst at temperatures above about 250° F., comprise the corresponding mercaptans when the secondary feed is hydrogen sulfide. These constituents are more readily adsorbable than either of the feed streams and may be stripped from the adsorbent by indirect heating and stripping steam.

*Example V*

The oxidation of methanol to form formaldehyde may be carried out with particular advantage according to the methods of this invention. The extremely high pressures existing in the adsorbed phase on the adsorbent in which the reactions take place strongly inhibits the decomposition of formaldehyde to carbon monoxide and hydrogen. Preferably the adsorbent contains an oxidation catalyst such as metallic copper, vanadium oxide, or the like impregnated thereon. The temperature of the reaction in sections adjacent to the primary and secondary feed inlets is preferably maintained below 575° F. and preferably less than about 300° F. The formaldehyde product is recovered from the adsorbent by indirect heating and steam stripping and subsequently concentrated by fractionation or other means. The gases may be introduced at pressures of about atmospheric or somewhat higher, if desired.

*Example VI*

The hydration of nitrogen dioxide ($2NO_2 \rightleftarrows N_2O_4$) is also a reaction which is favorably effected according to the method of this invention. A gas containing nitrogen dioxide is employed as the primary feed. The nitrogen dioxide is adsorbed and carried downwardly through the reactor with the adsorbent to the hydration zone above the heating zone and the unadsorbed gas is removed from the adsorption zone. The adsorbent contacts stripping and hydration steam introduced below the heating zone and the hydration reaction takes place above about 230° F. in what is noted on the drawing as section 14 with the formation of nitric acid which is adsorbed and the liberation of nitric oxide (NO) which is unadsorbed. The nitric acid is more readily adsorbed and is subsequently liberated from the adsorbent in the heating zone by indirect heat and stripping steam. The mixture of nitric acid and steam is concentrated in the fractionator shown. The nitric oxide liberated in the reaction passes into section 13 wherein it is combined with the secondary feed which consists of a gas containing oxygen such as air or other gas. The nitric oxide is readily oxidized to nitrogen dioxide in section 13 and returns to the lower part of the reactor with a moving bed of absorbent to be hydrated. Gases other than oxygen introduced with the secondary feed pass out of the adsorption section with unadsorbed gases of the primary feed. Herein sections 12, 13, and 14 comprise adsorption, oxidation, and hydration zones, respectively. Especially efficient conversions to nitric acid have been possible in this process.

*Example VII*

The production of sulfur from hydrogen sulfide and sulfur dioxide is readily carried out according to the methods of this invention by employing hydrogen sulfide as the primary feed and sulfur dioxide as the secondary feed. The adsorbent temperature is preferably maintained between the limits of 200° F. and 600° F. adjacent to the points of feed inlet in the absence of a catalyst. Finely divided sulfur is formed in the adsorbent which is subsequently removed therefrom by means of indirect heating and stripping or by extraction. The feed gases are preferably introduced at atmospheric pressure and lower temperatures in the range given above and longer contact times are preferred.

*Example VIII*

The preparation of organic esters by the esterification of an alcohol and an acid is especially easily carried out according to this invention and is a representative reaction of those favored by quick removal of the product from the sphere of the reaction. Preferably the lower molecular weight alcohols and esters are employed since these are easily vaporized. Preferably temperatures between about 100° F. and 350° F. have been found optimum in the presence of an adsorbent such as charcoal containing an impregnated esterification catalyst such as sulphuric or phosphoric acids. The alcohol and acid comprise the primary and secondary feeds in which the primary feed consists of the reactant having a lower boiling point. In the preparation of ethyl acetate, ethyl alcohol vapor may be introduced as the primary feed at a temperature of about 200° F. followed by acetic acid vapor as secondary feed introduced at a temperature of 240° F. The ethyl acetate formed is readily absorbed and is removed with the adsorbent from the sphere of the reaction and carried into the stripping zone. At this point, indirect heating causes desorption of the ester which is recovered from a point immediately above the heating zone. Since the esterification reaction takes place above the point of withdrawal of ester and stripping steam, acid and alcohol resulting from any ester hydrolysis is returned to the reaction zone for re-esterification. Careful control therefore permits production of substantially uncontaminated ester product.

*Example IX*

The reaction of carbon monoxide with hydrogen to form synthetic hydrocarbons and oxygenated compounds may be effected according to the process of this invention by employing an adsorbent such as charcoal impregnated with a hydrogenation catalyst such as nickel, iron, etc. Hydrogen is introduced as the primary feed at a rate to effect substantial saturation of the downwardly flowing adsorbent through the reactor. Carbon monoxide is introduced as secondary feed and the reaction takes place adjacent to or above the secondary feed inlet. The adsorbent is preferably controlled to a temperature of from 350° F. to 650° F. and the products of the hydrogenation are removed from the adsorbent in the stripping zone by indirect heating and steam stripping.

*Example X*

The chlorination of hydrocarbons such as for example ethane may be carried out at temperatures in the range of from 250° F. to 800° F. in the absence of a catalyst to form chlorinated hydrocarbons. A hydrocarbon such as ethane is employed as the primary feed to saturate the downward adsorbent and a halogen such as chlorine or bromine is introduced as the secondary feed. The halogenated hydrocarbon product is desorbed from the adsorbent in the stripping zone and recovered by distillation or other known means. The hydrogen chloride which may be formed in the reaction is separated from the adsorbent. Preferably less than a theoretical quantity of halogen is employed to effect an economic conversion to the desired product. Saturated or unsaturated hydrocarbons may be employed as the primary feed.

The above examples have been cited to illustrate the application of the principles of the process of this invention to carrying out chemical reactions which are beneficially effected by an increase in pressure or by the rapid and efficient removal of readily adsorbable reaction products from the sphere of the reaction. The internal adsorption pressures of adsorbents such as activated charcoal are extremely high and the present invention which has wide application to many chemical reactions takes advantage of this adsorption pressure by effecting these chemical reactions in the adsorbent phase on the adsorbents.

The foregoing description of the alkylation reaction is intended to clearly illustrate and explain the process of the invention and to describe the apparatus in which the process is carried out. This description is not intended to limit the present invention to a particular chemical reaction or process since the application of adsorption pressures to many gas or vapor phase reactions has been shown to be of advantage.

It should be emphasized that we do not wish to be limited by the particular compounds or methods of operation mentioned inasmuch as our invention includes and defines the broad principle of utilizing the extremely high internal adsorption pressures of activated charcoal and activated charcoal containing catalytic agents suitable for alkylating hydrocarbons. By utilizing these internal pressures we are able to eliminate the use of artificially induced pressures which in many alkylation processes must be at least as high as 1000 pounds per square inch. Such elevated pressures increase both the difficulty and cost of any operation and their elimination represents the major advantage of our process. Further by alkylating according to the present invention the only catalyst regeneration required is a simple steam stripping of the alkylate from the catalyst itself. By employing temperatures below the point at which carbon to carbon bond rupture is initiated build up of a carbon deposit on the surface of the catalyst is avoided. For this reason a high temperature burn off with air which normally prevents the use of charcoal base catalysts is unnecessary.

Further, the disclosure of activated charcoal, the preferred adsorbent, is not to be considered as limiting this invention since the principles of this process may be applied using other adsorptive materials.

The inventors are well aware that charcoal catalysts have been disclosed in the prior art for the alkylation of olefins and isoparaffins but in none of this art is there any disclosure of the novel principles of the present invention. These charcoal catalysts have been employed in high temperature-high pressure reaction systems wherein a mixed olefin-isoparaffin feed has been passed over the catalyst and subsequently condensed to obtain the reaction products therefrom. It is apparent from the foregoing disclosure that our process is widely different from the art, embodying as it does a different principle of physical laws and different methods of operation.

This application is a continuation-in-part of copending applications Serial No. 600,000, filed June 18, 1945, and Serial No. 603,802, filed July 9, 1945, both now abandoned.

A particular embodiment of the present invention has been hereinabove described in considerable detail by way of illustration. It should be understood that various other modifications and adaptations thereof may be made by those skilled in this particular art without departing from the spirit and scope of this invention as set forth in the appended claims.

We claim:

1. An improved continuous process for carrying out chemical reactions between gaseous or vaporous reactants, which reactions are favorably effected by the application of pressure, which process comprises first contacting the less readily adsorbable reactant with a moving bed of solid granular adsorbent which is impregnated with a catalytic material favorably effecting the rate of said chemical reaction and which is maintained at reaction temperature, second contacting the moving bed of adsorbent containing the less readily adsorbable reactant adsorbed thereon with a more readily adsorbable reactant and thereby reacting the two in the adsorbed phase on the adsorbent, subsequently indirectly heating the moving bed of adsorbent while countercurrently contacting the same with a stripping gas to desorb the reaction product, and returning the moving bed of adsorbent to contact further quantities of said reactants.

2. A process for the alkylation of hydrocarbons by contacting an olefin hydrocarbon and an isoparaffin hydrocarbon which comprises the steps of adsorbing one of said hydrocarbons having the lower molecular weight on a solid adsorptive catalyst consisting of a major proportion of an activated charcoal and a minor proportion of an alkylation catalyst, contacting said hydrocarbon saturated catalyst with the higher molecular weight of said olefin and said isoparaffin hydrocarbons under alkylation conditions, stripping the resultant alkylate and residual unreacted hydrocarbons from the catalyst with steam, separating said hydrocarbons and alkylate from said stripping steam and distilling said alkylate and said unreacted hydrocarbons to separate said alkylate from said unreacted hydrocarbons.

3. A process according to claim 2 wherein said alkylation catalyst is selected from the group of alkylation catalsyts consisting of inorganic acids and metal salts thereof.

4. A process according to claim 3 wherein the olefin contacting said catalyst consists of butylene hydrocarbons and the isoparaffin which contacts said catalyst is isobutane.

5. A process according to claim 4 in which the activated charcoal is selected from the class consisting of the hull and pit charcoals.

6. A process for the alkylation of an isoparaffinic hydrocarbon with an olefinic hydrocarbon which comprises establishing a continuous cyclic flow of an activated charcoal catalyst through successive zones of adsorption, alkylation, rectification, and stripping, introducing one of the above mentioned hydrocarbons having the lower molecular weight into said adsorption zone, introducing the higher molecular weight of said hydrocarbons into said alkylation zone so as to countercurrently contact therein under alkylation conditions the adsorbent containing adsorbed lower molecular weight hydrocarbon, stripping alkylated hydrocarbons from the adsorbent in said stripping zone, withdrawing unadsorbed gases from said adsorption zone, and withdrawing alkylated hydrocarbons from said stripping zone.

7. A process for the synthesis of hydrocarbons by reacting a hydrocarbon of relatively lower molecular weight with a hydrocarbon of relatively higher molecular weight which comprises the steps of adsorbing said hydrocarbon of lower molecular weight on an activated charcoal catalyst, contacting said hydrocarbon saturated catalyst with said higher molecular weight hydrocarbon under reaction conditions, stripping the resultant reaction product and residual unreacted hydrocarbons from the catalyst, and separating said stripped reaction product from said unreacted hydrocarbons.

8. A process for alkylating an olefin and an isoparaffin hydrocarbon which comprises the steps of adsorbing the less readily adsorbable hydrocarbon on a granular adsorbent, subsequently contacting the hydrocarbon saturated adsorbent thus formed with the more readily adsorbable hydrocarbon under alkylating conditions, and stripping the resultant alkylate from said adsorbent.

9. A process for alkylating an olefin and an isoparaffin hydrocarbon which comprises the steps of adsorbing the less readily adsorbable hydrocarbon on a granular adsorbent, subsequently contacting the hydrocarbon saturated adsorbent thus formed with the more readily adsorbable hydrocarbon under alkylating conditions, steam stripping the resultant alkylate and residual unalkylated hydrocarbons from said adsorbent and separating said alkylate from said unalkylated hydrocarbons.

10. A continuous process for the esterification of an alcohol and an acid as reactants having different degrees of adsorbability on a solid granular adsorbent which comprises first contacting a bed of solid granular adsorbent with the less readily adsorbable reactant to adsorb at least part of said reactant thereon, then contacting the thus treated adsorbent with the more readily adsorbable reactant forming an ester in the adsorbed high pressure phase on the adsorbent and stripping the esterified product from the adsorbent.

11. A continuous esterification process for reacting an alcohol with an organic acid as reactants which comprises passing a moving bed of granular adsorbent downwardly by gravity through an adsorption zone, an esterification zone and a stripping zone, introducing the reactant of lower boiling point in the vapor phase into said adsorption zone to contact said adsorbent, passing the reactant of higher boiling point in the vapor phase into said esterification zone to contact the adsorbent containing adsorbed lower boiling reactant forming an adsorbent containing an esterified product adsorbed thereon, heating said adsorbent in said stripping zone and desorbing an ester product therefrom and returning the lean adsorbent thus formed to contact further quantities of said lower boiling reactant.

12. A process according to claim 11 wherein said adsorbent is impregnated with an esterification catalyst.

13. A process according to claim 12 wherein said catalyst is selected from the group consisting of sulfuric acid and phosphoric acids in an amount insufficient to substantially reduce the adsorption capacity of said adsorbent.

14. A process for the production of ethyl acetate according to claim 13 wherein said catalyst is first contacted with ethyl alcohol vapor as the reactant of lower boiling point and said catalyst is then contacted with acetic acid vapor as the reactant of higher boiling point and wherein ethyl acetate is the ester product desorbed from said adsorbent.

15. A process according to claim 14 wherein the contacts of said catalyst with said reactants are effected at temperatures between about 100° F. and about 350° F.

16. A process for the production of reaction products of carbon monoxide and hydrogen which comprises passing a moving bed of solid granular adsorbent downwardly by gravity successively through an adsorption zone, a carbon monoxide hydrogenation zone and a product stripping zone, passing a stream of hydrogen through said adsorption zone, passing a stream of carbon monoxide into said hydrogenation zone to contact the hydrogen-containing adsorbent under carbon monoxide hydrogenation conditions of temperature forming reaction products on the adsorbent in the superatmospheric pressure adsorbed gas phase thereon, stripping adsorbed reaction products therefrom in said stripping zone and returning the stripped lean adsorbent to contact further quantities of said hydrogen.

17. A process according to claim 16 wherein the temperature of said adsorbent during reaction is maintained between about 350° F. and about 650° F.

18. A process according to claim 17 wherein said adsorbent is impregnated with a carbon monoxide hydrogenation catalyst.

19. A process for the hydration of unsaturated hydrocarbons which comprises contacting a solid granular adsorbent with said unsaturated hydrocarbon to adsorb a substantial proportion thereof in the absence of substantial superatmospheric applied system pressures, subsequently contacting the unsaturated hydrocarbon saturated adsorbent at substantially the same system pressure with a more readily adsorbable reactant selected from the group consisting of steam and hydrogen sulfide under reaction conditions, and subsequently desorbing the resultant reaction product from said adsorbent.

20. A process according to claim 19 in combination with the step of passing a moving bed of said granular adsorbent successively through zones of hydrocarbon adsorption and hydrocarbon hydration.

21. A process according to claim 19 wherein said unsaturated hydrocarbon is ethylene.

22. A process according to claim 21 wherein said ethylene is reacted with steam as a more readily adsorbable reactant to produce ethyl alcohol.

23. A process for the hydration of olefins which comprises contacting said olefins with a catalyst consisting of a major proportion of an activated charcoal and a minor proportion of a catalytic agent selected from the group consisting of sulfuric acid, phosphoric acid, salts of said acids and mixtures thereof in an adsorption zone whereby a substantial proportion of said olefins are adsorbed by said catalyst; passing the resulting catalyst to a hydration zone where it is treated with steam at a temperature above about 230° F. and at atmospheric pressures or above to effect the hydration of at least a portion of said adsorbed olefins and stripping the resultant hydrates from the catalyst.

24. A process for the hydration of unsaturated hydrocarbon gases which comprises establishing a circulating stream of charcoal which moves downward by gravity through successive zones of adsorption, hydration and stripping respectively, introducing a mixture of ethylene and propylene into the lower portion of said adsorption zone, removing unadsorbed ethylene from the upper portion of said adsorption zone, introducing steam into the lower portion of said stripping zone, and removing steam and products of hydration from the upper portion of said stripping zone while maintaining in said hydration zone an elevated temperature sufficient to effect hydration of said unsaturated hydrocarbons with adsorption of steam and products of hydration, and maintaining in said stripping zone a higher temperature sufficient to desorb said adsorbed steam and products of hydration.

25. A process according to claim 23 in which the activated charcoal is selected from the class of charcoals consisting of the hull and pit charcoals.

26. A process for the hydration of olefins which comprises contacting said olefin in an adsorption zone with charcoal whereby a substantial portion of said olefin is adsorbed on said charcoal removing unadsorbed olefin from said adsorption zone, causing said charcoal containing said olefin adsorbed thereon to flow from said adsorption zone to a treating zone, contacting said charcoal flowing into said treating zone with steam to effect the hydration of a portion of said adsorbed olefin and the desorption from said charcoal of the remainder of said adsorbed olefin, causing said desorbed olefins to flow back into said absorption zone, flowing said charcoal containing adsorbed thereon the hydrated olefins and said treating steam from said treating zone into a stripping zone, contacting said charcoal in said stripping zone with an excess of high temperature steam to desorb said hydrated olefins and said treating steam, removing a portion of said desorbed hydrated olefins and steam from said stripping zone, flowing a portion of said steam and hydrated olefins from said stripping zone to said treating zone, flowing said charcoal from which said last named components have been stripped from said stripping zone to a cooling zone and from said cooling zone to said adsorption zone.

References Cited in the file of this patent

UNITED STATES PATENTS

| | | |
|---|---|---|
| 1,767,057 | Dotter | June 24, 1930 |
| 1,784,536 | Pantenburg | Dec. 9, 1930 |
| 1,799,858 | Miller | Apr. 7, 1931 |
| 1,984,164 | Stock | Dec. 11, 1934 |
| 1,986,882 | Dreyfus | Jan. 8, 1935 |
| 2,110,879 | Joshua | Mar. 15, 1938 |
| 2,121,793 | Goshorn et al. | June 28, 1938 |
| 2,159,140 | Eckell | May 23, 1939 |
| 2,173,187 | Tanner | Sept. 19, 1939 |
| 2,355,868 | Jean | Aug. 15, 1944 |
| 2,378,040 | Schulze | June 12, 1945 |
| 2,384,311 | Kearby | Sept. 4, 1945 |
| 2,394,887 | Berl | Feb. 12, 1946 |
| 2,496,621 | Deery | Feb. 7, 1950 |

FOREIGN PATENTS

| | | |
|---|---|---|
| 211,845 | Great Britain | Feb. 26, 1925 |